United States Patent
Grotelueschen et al.

(10) Patent No.: US 7,527,555 B2
(45) Date of Patent: May 5, 2009

(54) GRAIN UNLOADER CONVEYOR TUBE WITH DRIBBLE CONTROL DOOR

(75) Inventors: Nathan C. Grotelueschen, Lancaster, PA (US); Clayton E. Banks, Jr., Brownstown, PA (US); Andrew J. Horst, Reading, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/157,280

(22) Filed: Jun. 9, 2008

(65) Prior Publication Data
US 2008/0305843 A1     Dec. 11, 2008

Related U.S. Application Data

(60) Provisional application No. 60/933,697, filed on Jun. 7, 2007.

(51) Int. Cl.
*A01D 17/02* (2006.01)
(52) U.S. Cl. ........................ 460/114; 198/534; 198/536
(58) Field of Classification Search ................. 460/114; 198/534, 523, 536, 671, 657, 550.2, 22, 548; 193/12, 22, 23, 25 A, 30
See application file for complete search history.

(56) References Cited

U.S. PATENT DOCUMENTS

| | | | |
|---|---|---|---|
| 929,514 A * | 7/1909 | Tenold | 210/131 |
| 1,505,996 A * | 8/1924 | Drought | 43/66 |
| 1,721,258 A | 7/1929 | Payne | |
| 1,885,656 A | 11/1932 | Wallace | |
| 2,625,001 A | 1/1953 | Heun | |
| 2,818,163 A * | 12/1957 | Hilblom et al. | 198/536 |
| 3,815,781 A | 6/1974 | Armstrong et al. | |
| 4,164,327 A | 8/1979 | Clark | |
| 4,540,086 A * | 9/1985 | David et al. | 198/536 |
| 4,830,288 A * | 5/1989 | Streicher | 241/40 |
| 4,881,855 A | 11/1989 | Rempel et al. | |
| 5,167,581 A * | 12/1992 | Haag | 460/114 |
| 5,348,138 A * | 9/1994 | Seemann | 198/671 |
| 6,591,974 B2 | 7/2003 | Tofin et al. | |
| 6,691,861 B2 | 2/2004 | Reimer et al. | |

FOREIGN PATENT DOCUMENTS

| | | |
|---|---|---|
| JP | 10215663 | 8/1998 |
| JP | 11187753 | 7/1999 |

* cited by examiner

*Primary Examiner*—Árpád Fábián-Kovács
(74) *Attorney, Agent, or Firm*—Michael G. Harms; John William Slader; Patrick M. Sheldrake

(57) ABSTRACT

Dribble control apparatus including a dribble control door hingedly or pivotally connected to an upper portion of a tube of a grain unloading conveyor. The door has a closed position covering a discharge opening of the tube for preventing grain dribbling, and an open position. The door has a shape which positions a center of gravity of the door for urging the door toward the closed position, including when closed, and which enables the door to support itself in the open position on a stream of grain flowing from the discharge opening with at least a substantial portion of the door spaced above the grain stream, while influencing or controlling an outward extent and direction of the flow of the stream.

17 Claims, 8 Drawing Sheets

GRAIN UNLOADER CONVEYOR TUBE WITH DRIBBLE CONTROL DOOR

This application claims the benefit of U.S. Provisional Application No. 60/933,697, filed Jun. 7, 2007.

TECHNICAL FIELD

The present invention relates to a dribble door for the discharge opening of a grain unloader conveyor tube of a combine harvester, and more particularly, a dribble door configured so as to be supportable on a stream of grain discharged through a discharge opening of the conveyor while only minimally contacting the grain stream to influence or control the extent and direction of outflow of at least a portion of the stream, and which is shaped and oriented so as to be urged by its center of gravity toward a closed position covering at least the lower portion of the discharge opening, for preventing dribble.

BACKGROUND ART

U.S. Provisional Application No. 60/933,697, filed Jun. 7, 2007, is hereby incorporated by reference in its entirety.

During an unload cycle for a combine harvester, the unloader conveyor (typically a helical auger) is operated to move grain from the grain tank of the harvester to another tank or receptacle, such as on a truck or wagon. A well-known problem associated with unloader conveyors of combine harvesters, is that grain that remains in the unloader conveyor tube after an unload cycle, can continue to dribble out of the discharge opening, as the unloader conveyor is swung to its transport position, and with the conveyor in the transport position, particularly as the harvester is moved over rough terrain, up hills, and the like.

A variety of dribble control doors have been utilized in attempts to reduce the dribble problem. Reference in this regard, Reimer et al. U.S. Pat. No. 6,691,861 issued to Deere & Company, which discloses a dribble door pivotally mounted to a bottom periphery of an unloader conveyor tube, for preventing dribble when in a raised position, and which has a spout like shape to allow unobstructed grain flow when in a lowered position. A spring biases the door toward the raised position. However, an observed shortcoming of dribble doors such as this which are pivotable at the bottom, is that, absent some kind of powered actuator, grain pressure is required to maintain the door in the lowered position, and as the discharged grain flow tapers off, the spring force can prematurely lift the door so as to trap an undesirable amount of grain in the unloader tube. And, if a large quantity of grain remains, and the spring force is low or weak, the door can be opened by jarring and the like, so as to dribble grain.

Thus, what is sought is a dribble control door which overcomes one or more of the problems, shortcomings, and/or disadvantages, set forth above.

SUMMARY OF THE INVENTION

What is disclosed, is a dribble control door which overcomes one or more of the problems, shortcomings, and/or disadvantages, set forth above.

According to one preferred aspect of the invention, a grain unloading conveyer for a combine harvester includes a tube having an interior passage containing a helical auger rotatable for conveying grain therethrough, and an outer end portion including a discharge opening in connection with the interior passage and through which the grain is discharged by the auger when rotated. A dribble control door includes an upper door portion and a lower door portion, the upper door portion having an upper peripheral portion pivotally mounted in or adjacent to an upper peripheral portion of the discharge opening. The door is pivotable between a closed position wherein the lower door portion covers at least a lower portion of the discharge opening for preventing dribbling of grain therefrom, and an open position extending outwardly from the opening. Additionally, the upper door portion and the lower door portion are angularly related, such that when the door is in the closed position, the upper door portion will extend downwardly and outwardly to about a vertical middle region of the opening and the lower door portion will extend downwardly from the upper door portion and inwardly to contact a lower peripheral portion of the tube to cover the lower portion of the opening.

As an attendant advantage of the above construction, the center of gravity of the door is positioned such that at least a substantial portion of the weight of the door will act to urge the door toward the closed position, in contrast to the case wherein the door is pivoted at the bottom. This feature is advantageous alone, or in conjunction with a biasing element, for instance, but not limited to, a spring, for automatically closing the door as the adjacent portion of the interior passage of the conveyor tube is emptied, or if the conveyor is turned off while still containing grain as can occur when unloading on the go while harvesting. And, particularly advantageous in this latter instance, the closing force provided by gravity will increase with the tilt of the tube upwardly toward the outer end.

As another preferred aspect of the invention, a latch, which can be, for instance, a mechanical latch, or magnetic, can be provided for releasably holding the door in the closed position.

As still another preferred aspect of the invention, the lower door portion includes a lowermost sidewardly extending lip configured for holding the door in the open position on a stream of grain discharged from the discharge opening, mostly away from the stream of grain, while directing at least an outermost portion of the stream downwardly. As another aspect, the lip can include a generally flat surface positioned and oriented to abut the lower peripheral portion of the tube when the door is in the closed position, and configured to ride on a stream of grain discharged from the opening for holding the door in the open position. Further, the flat surface can be straight, so as to impart a flat shape on an outermost periphery of a stream of grain discharged from the discharge opening. Still further, the lip can have a sideward extent greater than a sideward extent of the lower peripheral portion of the tube, so as to extend beyond opposite sides of the tube, which is advantageous and so as to encompass a sideward extent of a stream of grain discharged from the discharge opening, for guiding and directing the stream downwardly across up to its entire sideward extent.

According to another preferred aspect of the invention, the tube will have middle peripheral portions bounding opposite sides of the opening, respectively, having shapes which bulge outwardly in a direction of grain discharge from the opening. And, the door will have an angular shaped middle portion which at least generally conforms to the shapes of the middle peripheral portions so as to be located in abutting relation thereto when the door is in the closed position, and so as to be located at least substantially above a stream of grain supporting the door in the open position.

DETAILED DESCRIPTION OF THE INVENTION

Figure 1:
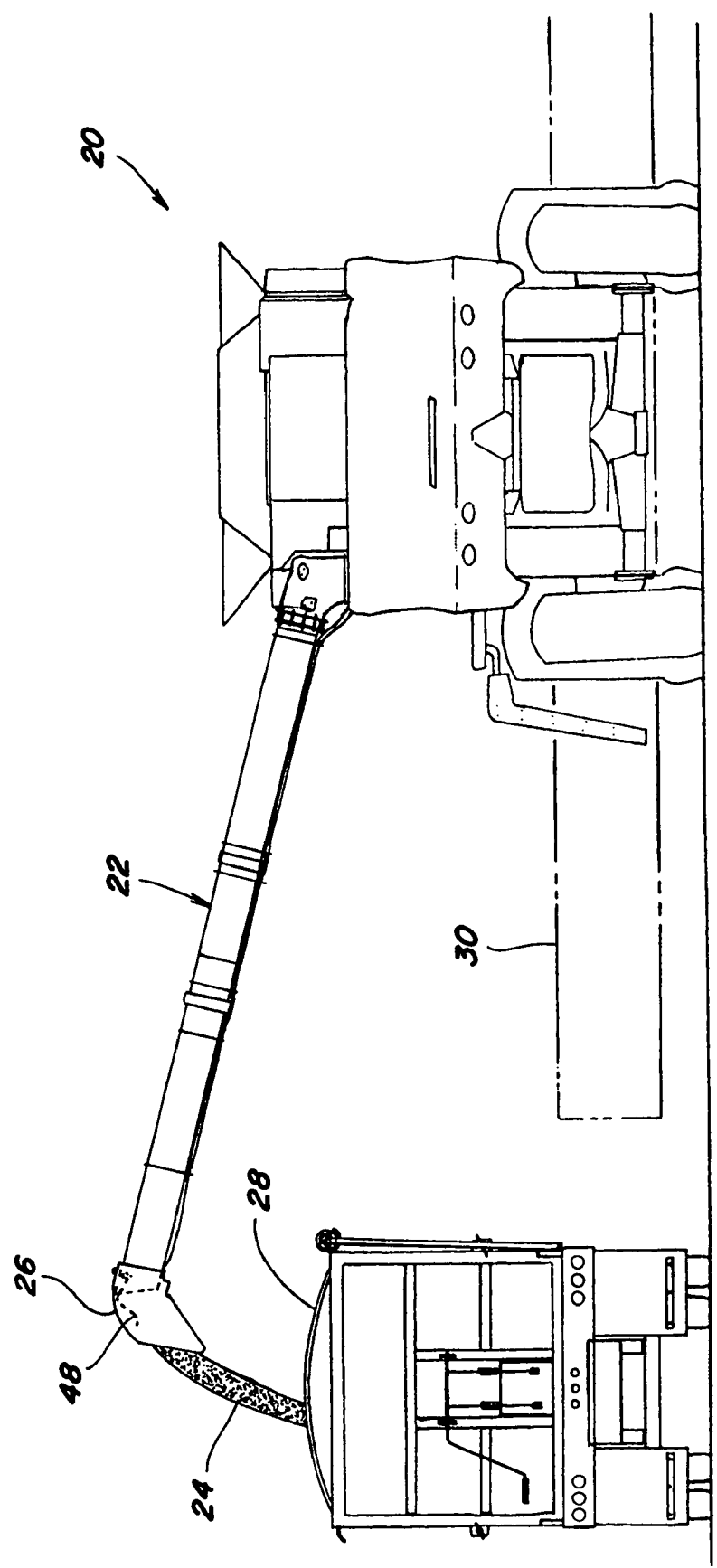
FIG. 1 is a rear end view of a combine showing grain unloading from an unloader conveyor into a truck, illustrating a dribble control door of the invention in dotted lines within a grain discharge boot on an outer end of the conveyor.
Figure 2:
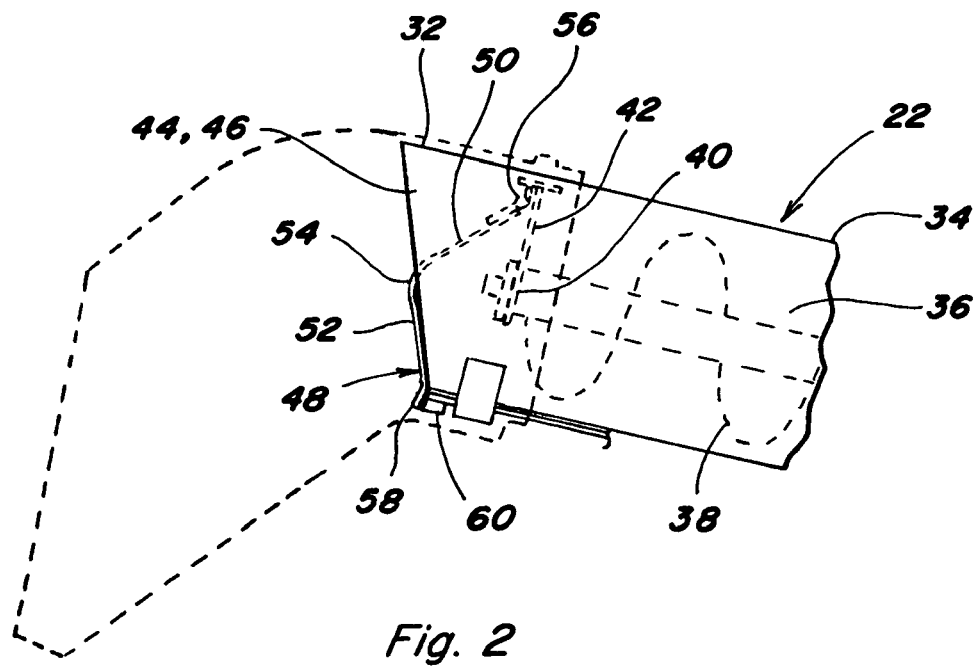
FIG. 2 is a fragmentary side view of the conveyor, with a discharge boot and other aspects thereof illustrated in dotted lines, and the dribble control door in a closed position.

Referring now to FIG. 1, a combine harvester 20 is illustrated, including an unloader conveyor 22 transversely extending and deployed outwardly in an unloading position as it unloads grain 24 through a discharge boot 26 into a grain truck 28. This unloading operation can occur as harvester 20 and truck 28 are moving, which is referred to as unloading "on the go", or stationary. At the end of the unloading operation, unloader conveyor 22 will be pivoted to a rearwardly directed transport position, extending along the adjacent side of harvester 20. It can be noted here, that truck 28 is located a substantial distance to the side of harvester 20, which is desired to avoid the possibility of contact with a header 30 mounted on the front of harvester 20, particularly when unloading on the go. It should also be noted that conveyor 22, when in the unloading position illustrated, will typically be tilted up toward the outer end thereof, at a greater angle, compared to when in the transport position, as additional height is often required to clear the top of the grain receptacle, here illustrated by truck 28. Additionally, it should be noted that when unloading grain in a manner such as illustrated, it is desirable to have a capability for at least somewhat controlling the trajectory of the outflowing grain, as it falls toward the receptacle, to limit the possibility of loss and control the location of deposition within the receptacle. Still further, upon cessation of the unloading operation, whether a substantial quantity of grain remains in conveyor 22, as would often be the instance when unloading on the go, or only a small quantity of grain remains, it is highly desirable and sought, to control inadvertent dribbling of grain from the end of the conveyor, for a variety of reasons, including for reducing grain loss and emergence of volunteer crops.

Referring also to FIGS. 2, 3, 4, 5 and 6, outer end 32 of conveyor 22 is illustrated. Conveyor 22 includes an elongate tube 34 defining and enclosing an interior passage 36 containing an elongate helical auger 38, supported by bearings for rotation about its longitudinal axis for conveying grain through passage 36, in a well-known manner. Auger 38 is rotated by a drive on harvester 20, also in the well known manner. A bearing 40 supporting the outer end of auger 38 is illustrated supported by bearing support structure 42, which can comprise, for instance, one or more struts, attached to an upper interior portion of tube 34 and extending downwardly into a center region thereof. Tube 34 additionally includes a circumferential periphery 44 extending around and defining an outwardly facing discharge opening 46 on outer end 32, through which a stream of grain, illustrated by stream 24, is discharged, as effected by the rotation of auger 38. Here, it should be noted that in FIGS. 1, 2 and 3, the grain is illustrated as being discharged through a boot 26, which is intended to be representative of a wide variety of different boot configurations that can be used on the end of an unloader conveyor, such as conveyor 22, the boot being absent from FIGS. 4, 5 and 6, to better show a dribble control door 48 of the invention.

Figure 7:
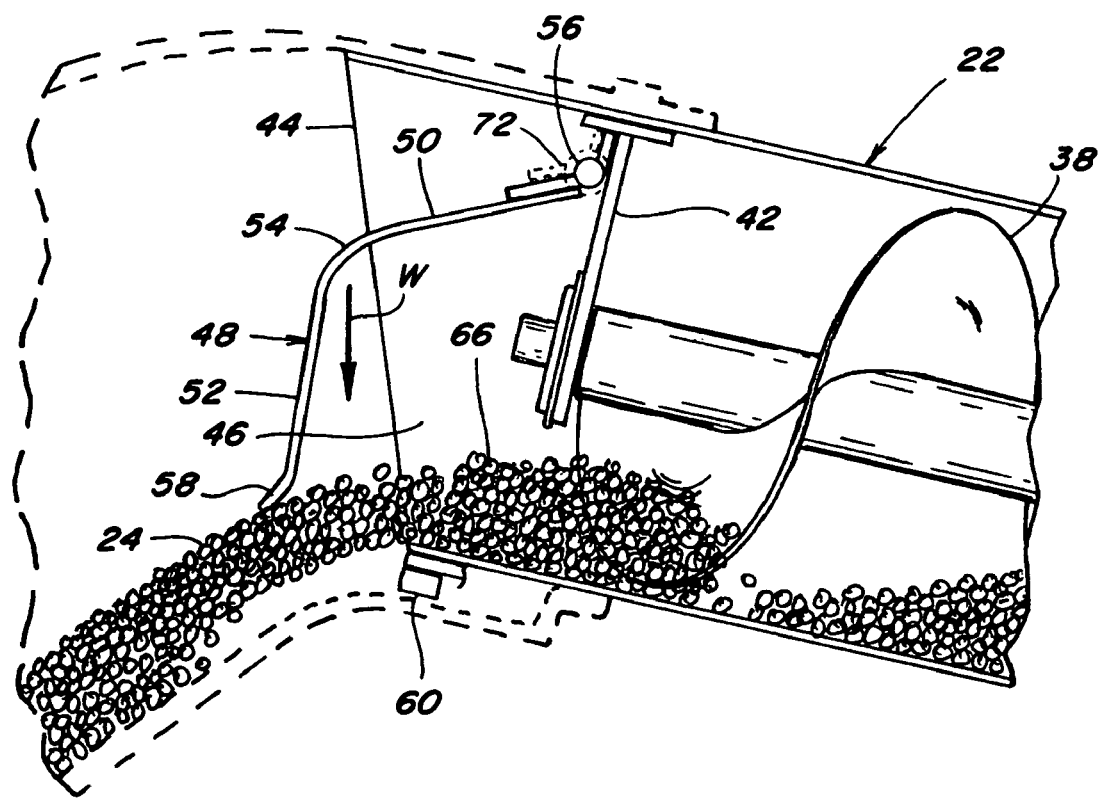
FIG. 7 is a side sectional view of the conveyor tilted at a representative unloading orientation, illustrating a small stream of grain being discharged supporting the dribble control door in a partially open position.
Figure 8:
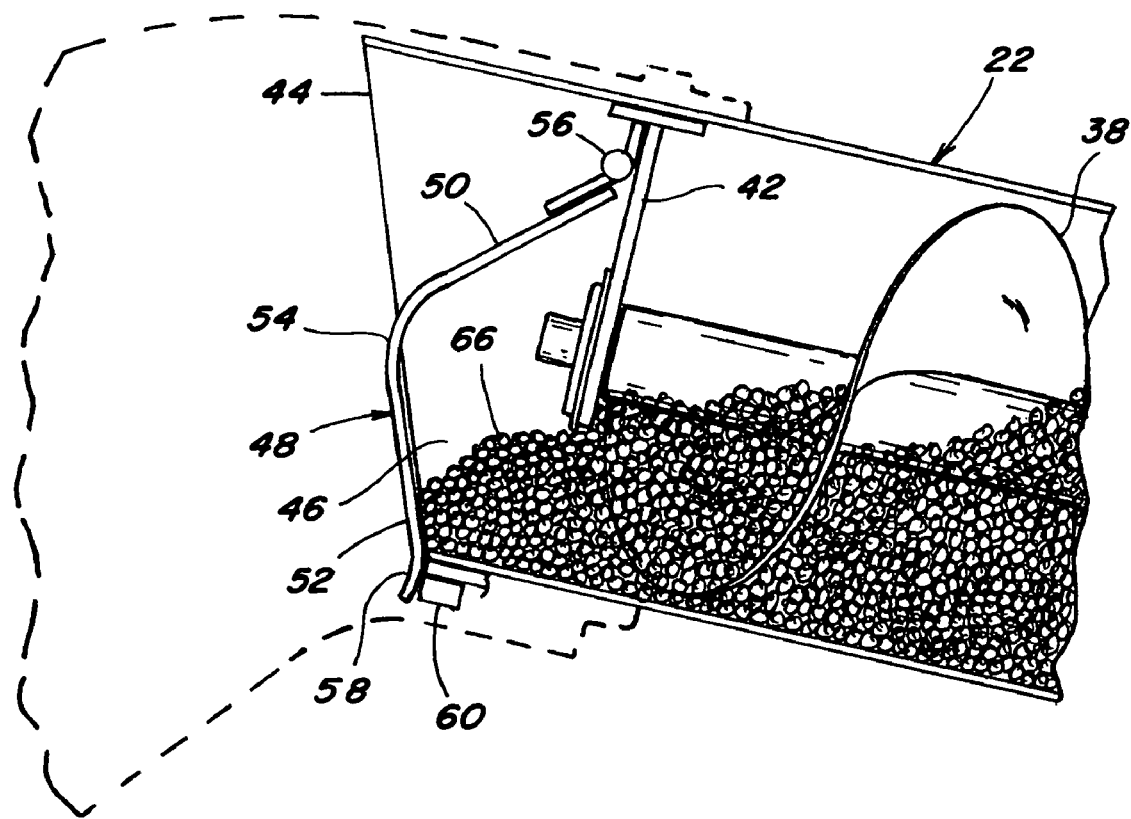
FIG. 8 is another side sectional view of the conveyor at the Representative unloading orientation, illustrating the dribble control door in the closed position containing a large quantity of grain within an interior passage of the conveyor, representative of conditions after unloading on the go.
Figure 9:
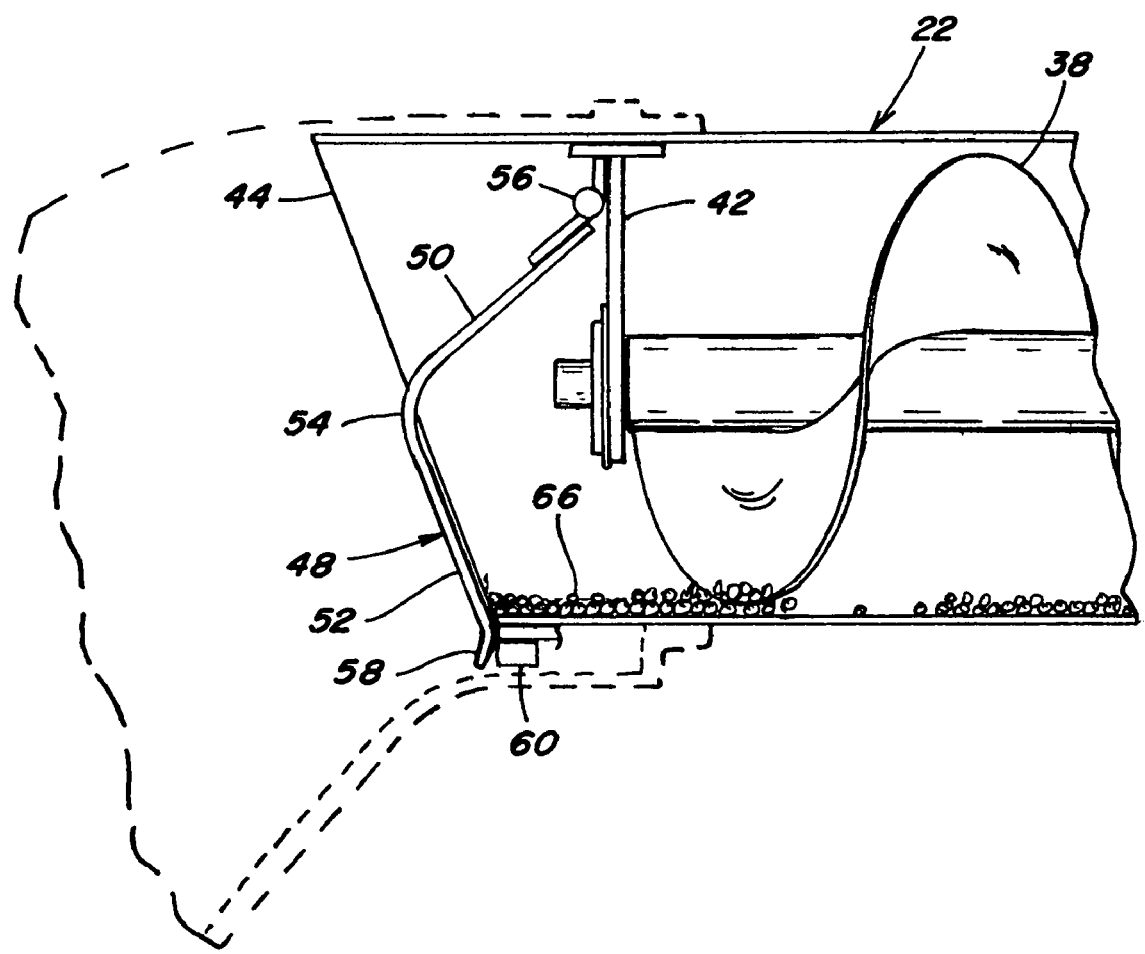
FIG. 9 is another side sectional view of the conveyor, at a representative transport orientation, illustrating the dribble control door in the closed position containing a small quantity of grain within the interior passage of the conveyor.

Referring also to FIGS. 7, 8 and 9, dribble control door 48 constructed and operable according to the teachings of the present invention, includes an upper door portion 50 and a lower door portion 52, upper door portion 50 having an upper peripheral portion pivotally mounted in or adjacent to an upper peripheral portion of discharge opening 46. Door 48 is pivotable between a closed position (FIGS. 2, 4, 5, 8 and 9) wherein lower door portion 52 covers at least a lower portion of discharge opening 46 for preventing dribbling of grain therefrom, and an open position (FIGS. 1, 3, 6, and 7 (partially open)) extending outwardly from opening 46. A preferred location of the pivotal connection of upper door portion 50 is spaced inwardly of discharge opening 46, and upper door portion 50 and lower door portion 52 are preferably angularly related at a middle angled region 54, such that when the door is in the closed position, upper door portion 50 will extend downwardly and outwardly through opening 46 to about a vertical middle region of opening 46, and lower door portion 52 will extend downwardly from upper door portion 50 and inwardly, but still outwardly of opening 46 and the pivotal connection, to contact a lower portion of periphery 44 of tube 34 to cover the lower portion of opening 46, to prevent dribbling.

This configuration is advantageous, as it locates a center of gravity of door 48, which for this door configuration will be about coincident with angled region 54, above and outwardly of opening 46, such that door 48, at least when open, and preferably also when closed, or nearly closed, will be urged by its weight, denoted by arrow W in FIG. 7, in the form of a moment about the pivotal connection to tube 34, to pivot or rotate toward the closed position, to provide a self or automatic closing capability in the absence of grain being forced thereagainst by the operation of auger 38. This moment and self-closing capability would be illustrated by counterclockwise pivotal movement of door 48 in the illustrations. This automatic closing capability is also facilitated by the typical more upward and outwardly tilted orientation of conveyor 22 when in the unloading position, as illustrated in FIGS. 1, 2, 3, 7 and 8, which places the center of gravity and thus most of the weight of door 48, more advantageously for urging the door toward the closed position, and which also places the lower portion of circumferential periphery 44 more outwardly relative to the pivotal connection of the door to tube 34. Further in this regard, this helps to offset the effect on the operation of the door, of a typical beveled configuration of circumferential periphery 44 in regards to closure of the door, which bevel is utilized for facilitating desired grain flow characteristics. Thus, it can be observed that upper door portion 50 is generally located within discharge opening 46, whereas lower door portion 52 is located outwardly of opening 46, including when door 48 is closed, and further, lower portion 52 will be in abutment with the lower portion of circumferential periphery 44, when the door is closed.

Upper door portion 50 is preferably supported in the above-described position for the above discussed advantageous positioning of door 48 and pivotal movement thereof, by a pivot 56, which can be, for instance, a hinge or other suitable pinned connection. Additionally, pivot 56 can be configured to comprise a self-closing pivot joint utilizing a biasing element 72 (FIG. 7), such as, but not limited to, a spring such as found on a common, commercially available self-closing hinge, for urging door 48 toward its closed position, or, a separate biasing element or other suitable device could be used.

As an additional feature, a latch 60 is preferably provided adjacent the lower portion of discharge opening 46, or at other suitable location, for releasably holding door 48 in the closed position. Here, latch 60 is configured as a magnetic latch including two magnets operable for magnetically holding a lowermost portion 58 of lower door portion 52 against the lowermost portion of circumferential periphery 44 of tube 34, such that lower door portion 52 is held in abutment with the larger lower portion of periphery 44, to prevent grain dribble. The magnets are selected so as to release door 48 when a force is exerted against the inner surface thereof, by operation of auger 38 to drive grain, represented by grain 66, against the door.

Here, it should be noted that upon cessation of operation of auger 38 while unloading on the go, a substantial amount of grain may be present in tube 34 adjacent to opening 46 (FIG. 8), or, virtually no grain may be present (FIG. 9), such as when the grain tank of harvester 20 is emptied by the unloading operation. It should also be noted that any remaining grain, as well as door 48, may be subject to significant jarring, acceleration forces, etc., due to operation and movements of harvester 20, and that the orientation (e.g., tilt) of conveyor 22 can vary widely. Thus it should be understood that for satisfactory operation of door 48 under the range of foreseeable conditions, it is desired for door 48 to have a self closing capability sufficient for containing and preventing grain dribbling under the most adverse of those conditions, yet which will allow door 48 to open when appropriate, that is, when operation of auger 38 to force grain against door 48, is commenced. Here, this capability is provided by the configuration and orientation of door 48, in combination with the provision of a latch 60 including two magnets selected so as to have sufficient strength for this purpose.

Figure 4:
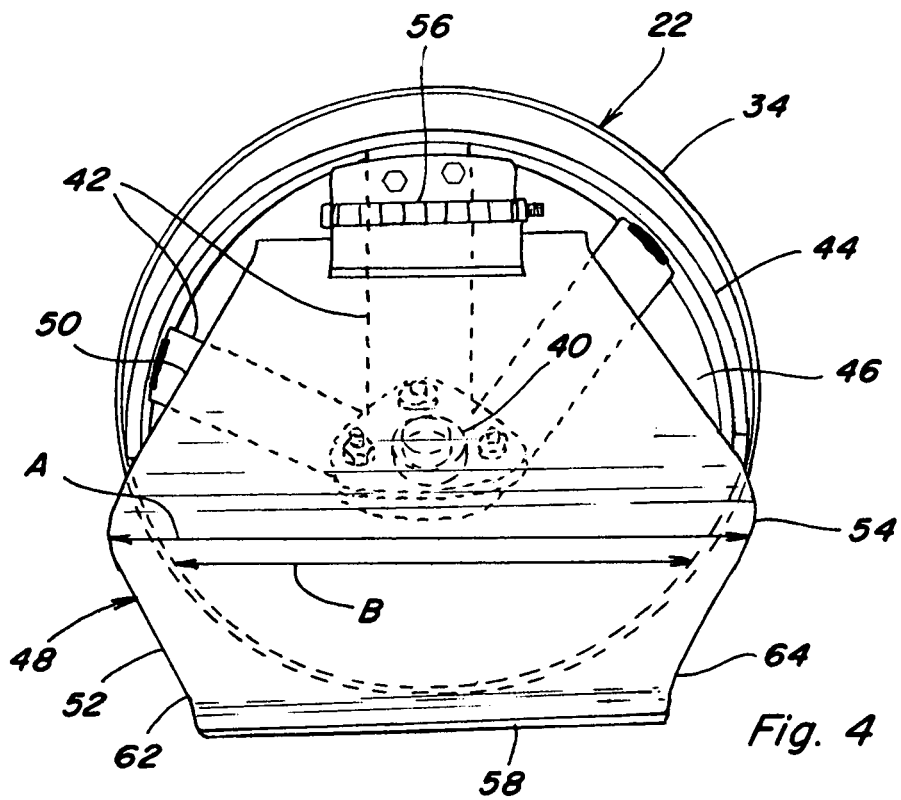
FIG. 4 is an end in view of the conveyor, with the dribble control door in the closed position.
Figure 5:
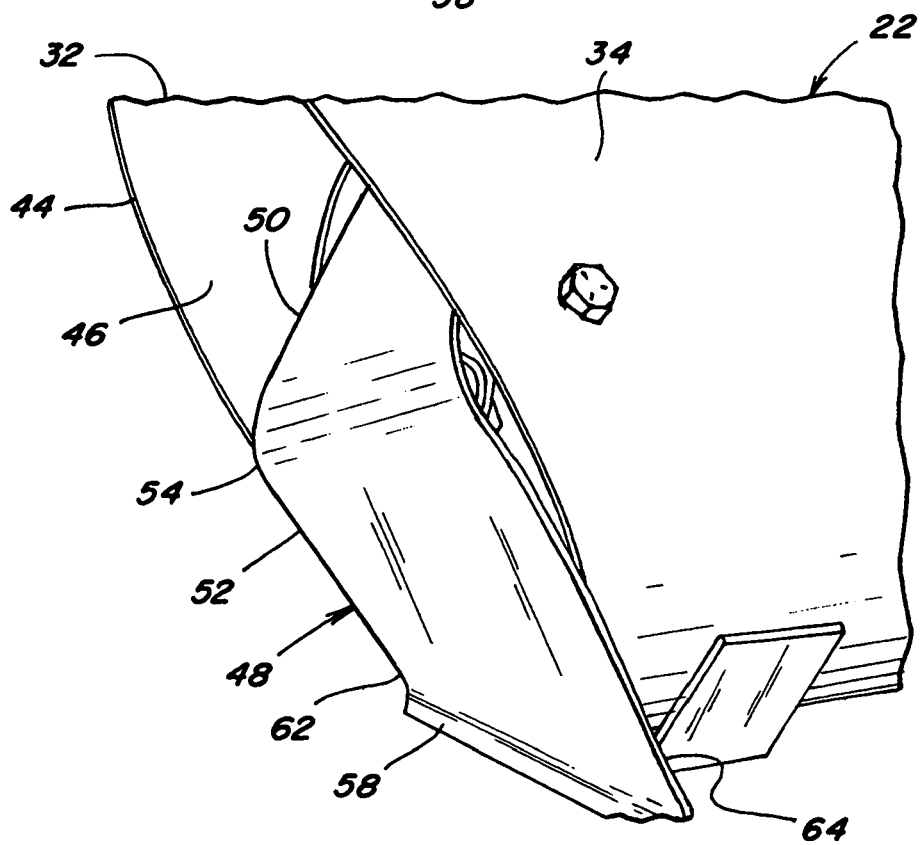
FIG. 5 is a perspective view of the conveyor with the dribble control door in the closed position.
Figure 6:
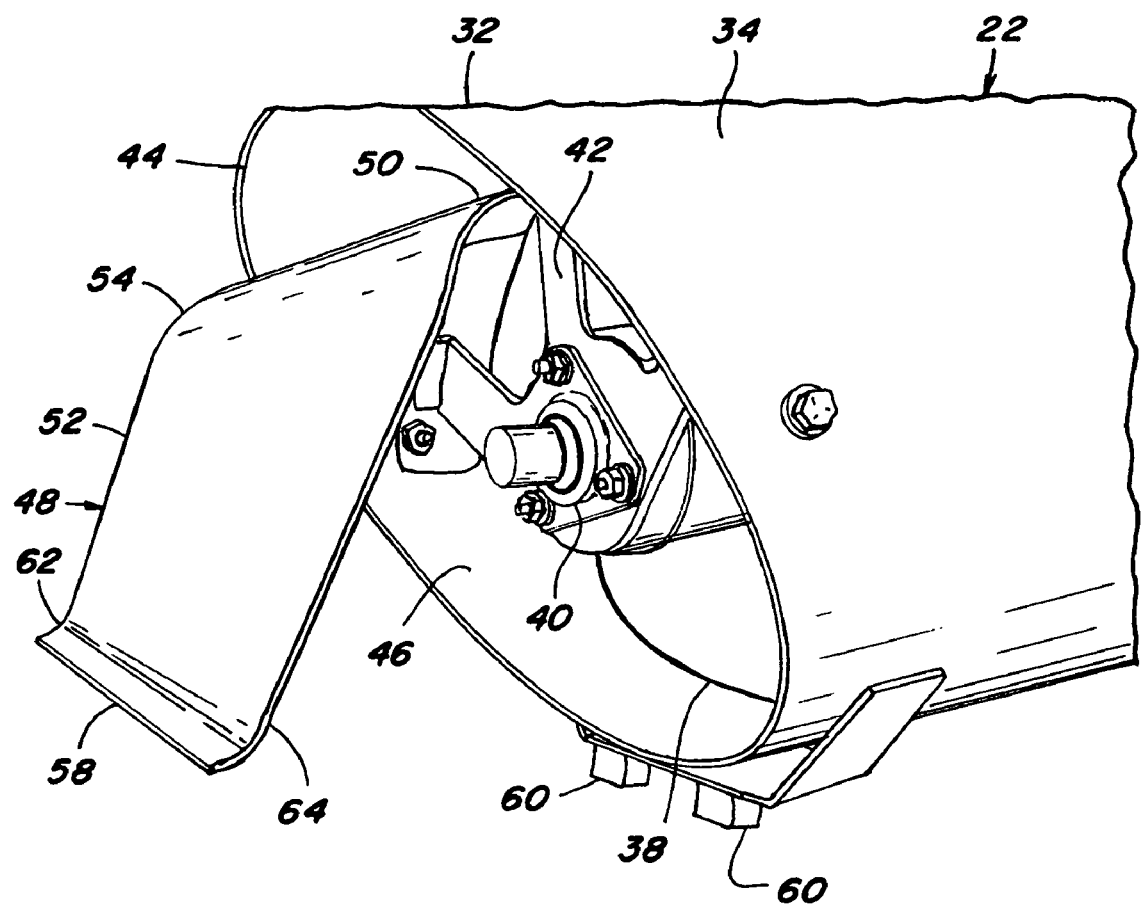
FIG. 6 is a perspective view of the conveyor with the dribble control door illustrated in an open position.

Referring more particularly to FIGS. 4 and 5, as another desirable feature of door 48, it can be observed that lower door portion 52 preferably has a greater sideward extent, denoted by arrow A, between opposite side portions 62 and 64 thereof, compared to a sideward extent, denoted by arrow B, of the lower portion of opening 46. This is advantageous, as it facilitates the abutment of lower door portion 52 with the lower portion of circumferential periphery 44 around the lower region of opening 46. It should also be noted that this greater extent of the lower door portion extends downwardly to lowermost portion 58.

Figure 3:
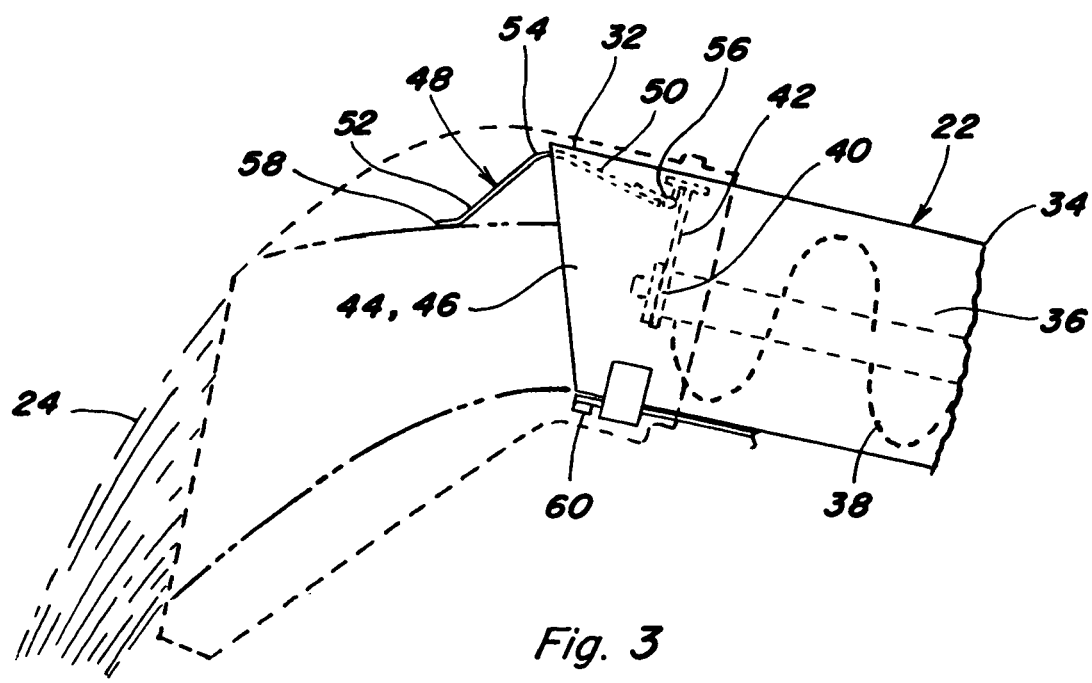
FIG. 3 is another fragmentary side view of the conveyor, with the discharge boot thereof illustrated in dotted lines, and the dribble control door in an open position supported on a stream of grain illustrated being discharged by the conveyor.

Additionally, lowermost portion 58 of door 48 is preferably configured so as to form a generally horizontally extending lip, which is preferably flat and/or straight, but which can have other shapes, as desired or required for a particular application. This is an advantageous feature, as when a stream of grain, such as stream 24 is being discharged through opening 46, lowermost portion 58 will essentially ride on an upper region of the stream, to support door 48 in the open position, as illustrated in FIGS. 3 and 7. As another advantage of this configuration, the weight of door 48, and any spring force present acting to urge door 48 downwardly, will serve to at least partially influence or direct or guide the outer extent of flow 24 more downwardly, toward a receiving container, such as truck 28 (FIG. 1). This capability can be provided alone, or in combination with a downward directing capability of an accompanying discharge boot, such as boot 26 illustrated. Here, the wider extent of lowermost portion 58 will be advantageous, as it is anticipated under some conditions, that the grain stream will fan out or widen after leaving opening 46. As another advantage of this in combination with the shape of door 48, most of door 48 will be spaced above stream 24 of the grain.

As still another advantage of the angular shape of door 48, it can be observed in numerous of the figures that this also accommodates and provides a concavity or space for the end of auger 38 and bearing 40. In this regard, although door 48 has a generally L shape profile when viewed from the side, it should be recognized and understood that other shapes that provide a concave inner surface, as well as other shapes, such as a more flat shape, could likewise be used in the present invention.

Figure 10:
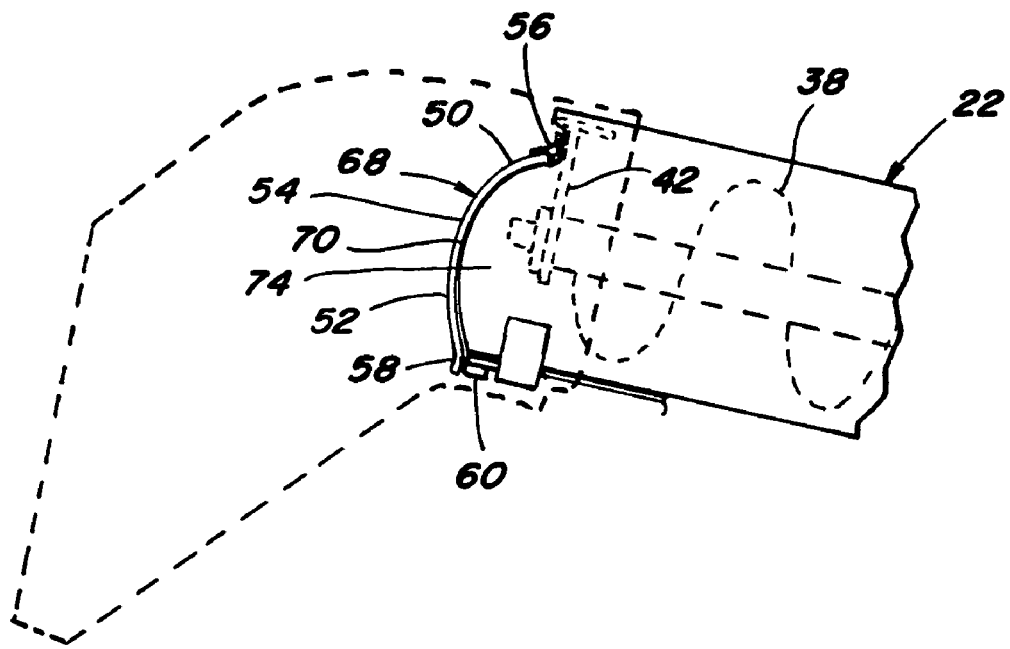
FIG. 10 is a fragmentary side view of an unloader conveyor with a discharge boot and other aspects of the conveyor illustrated in dotted lines, and including another embodiment of a dribble control door of the invention in a closed position.
Figure 11:
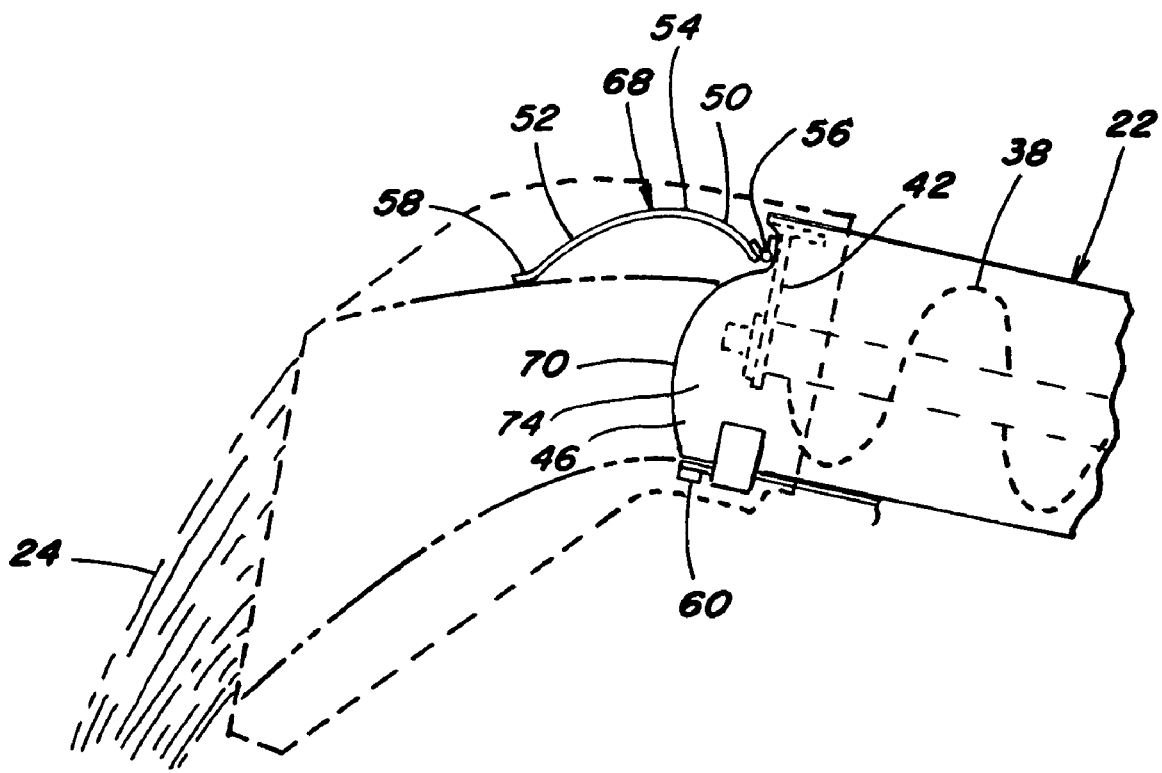
FIG. 11 is another fragmentary side view of the conveyor of FIG. 10, illustrating the door supported in an open position by a stream of grain being discharged by the conveyor.

Referring also to FIGS. 10 and 11 in this regard, conveyor 22 is shown including another dribble control door 68 constructed and operable according to the teachings of the present invention, like parts of door 68 and door 48 being identified by like numerals. Conveyor 22 generally includes an auger 38 rotatable for discharging a stream of grain 24 through discharge opening 46, in the above described manner. Here, it can be observed that door 68 has a smoother concave C shaped profile when viewed from the side, an upper door portion 50, a lower door portion 52, and a middle or angular region 54 therebetween. Upper door portion 50 is pivotally connected, as before, by a pivot 56, to bearing support 42. And, a lowermost portion 58 of the door includes or is shaped as a lip, engageable with a latch 60 for holding the door in the closed position, and for supporting the door on a stream 24 of grain being discharged from conveyor 22, again, as explained above. As another difference, conveyor 22 includes a circumferential periphery 70 extending around and defining a discharge opening 46, having peripheral side portions 74, which extend outwardly a greater distance that upper and lower peripheral portions, and so as to at least substantially conform in shape with the C shape of door 68, to provide adequate abutment and closure between door 68 and periphery 70 to prevent dribbling. Again, the concavity created by the shape of door 68 is advantageous as it accommodates the end of auger 38 and its supporting bearing. Also, lowermost portion 58 will preferably be flat, to provide the above described advantages.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiments of the invention; however, concepts, as based upon the description, may be employed in other embodiments without departing from the scope of the invention. Accordingly, the following claims are intended to protect the invention broadly as well as in the specific form shown.

What is claimed is:

1. A grain unloading conveyer for a combine harvester, comprising:

a tube having an interior passage containing a helical auger rotatable for conveying grain therethrough, and an outer end portion including a discharge opening in connection with the interior passage and through which the grain is discharged by the auger when rotated; and a dribble control door including an upper door portion and a lower door portion, the upper door portion having an upper peripheral portion pivotally mounted in or adjacent to an upper peripheral portion of the discharge opening, the door being pivotable between a closed position wherein the lower door portion covers at least a lower portion of the discharge opening for preventing dribbling of grain therefrom, and an open position extending outwardly from the opening, the upper door portion and the lower door portion being angularly related such that when the door is in the closed position the upper door portion will extend downwardly and outwardly to about a vertical middle region of the opening and the lower door portion will extend downwardly from the upper door portion and inwardly to contact a lower peripheral portion of the tube to cover the lower portion of the opening, wherein the lower door portion includes a lowermost sidewardly extending lip configured for holding the door in the open position on a stream of grain discharged from the discharge opening, mostly away train the stream of grain, while directing at least an outermost portion of the stream downwardly, wherein the lip comprises a generally flat surface positioned and oriented to abut the lower peripheral portion of the tube when the door is in the closed position, and configured to ride on a stream of grain discharged from the opening for holding the door in the open position, wherein the flat surface is straight, so as to impart a flat shape on an outermost periphery of a stream of grain discharged from the discharge opening.

2. The conveyor of claim 1, further comprising structure in the interior passage adjacent to the discharge opening supporting the auger, and wherein the upper door portion is pivotally mounted in connection with the structure.

3. The conveyor of claim 1, wherein the door has a shape which positions a center of gravity of the door outwardly of the discharge opening and the lower peripheral portion of the tube, and so as to urge the door toward the closed position.

4. The conveyor of claim 1, comprising a latch configured and operable for releasably holding the door in the closed position.

5. The conveyor of claim 1, wherein the lip has a sideward extent greater than a sideward extent of the lower peripheral portion of the tube, so as to extend beyond opposite sides of the tube, and so as to encompass a sideward extent of a stream of grain discharged from the discharge opening.

6. The conveyor of claim 1, wherein the door and the tube are configured such that when the door is in the closed position, the upper door portion will be located within the discharge opening and the lower door portion will be located outwardly of the opening and extend sidewardly beyond the lower peripheral region of the tube.

7. The conveyor of claim 1, wherein the outer end portion of the tube has side peripheral portions beside opposite sides of the middle region of the discharge opening, respectively, the side peripheral portions extending outwardly beyond the upper and lower peripheral portions of the tube.

8. The conveyor of claim 1, wherein the door has a C-shaped profile when viewed from the side.

9. The conveyor of claim 1, wherein the door has an L-shaped profile when viewed from the side.

10. Dribble control apparatus for a grain unloading conveyer for a combine harvester, comprising:

a dribble control door hingedly connected to an upper portion of a tube of the conveyor for pivotal movement between a closed position covering at least a lower portion of a discharge opening of the tube for preventing dribbling of grain from the opening, and an open position wherein the door will be supported on a stream of grain being discharged from the opening, the door having an upper portion configured to be received in the discharge opening when the door is in the closed position, and a lower portion configured to abut and extend sidewardly beyond opposite sides of a lower portion of the tube when the door is in the closed position, the lower portion including a lowermost portion configured to ride on a stream of grain discharged from the opening for supporting the door in the open position with an upper portion of the door at least largely spaced above the stream, and the door having a shape which locates a center of gravity thereof in a position for urging the door toward the closed position, wherein the lower portion includes a lowermost sidewardly extending lip configured for holding the door in the open position on a stream of grain discharged from the discharge opening, mostly away from the stream of grain, while directing at least an outermost portion of the stream downwardly, wherein the lip comprises a generally flat surface positioned and oriented to abut a lower peripheral portion of the tube when the door is in the closed position, and configured to ride on a stream of grain discharged from the opening for holding the door in the open position, wherein the flat surface is straight, so as to impart a flat shape on an outermost periphery of a stream of grain discharged from the discharge opening.

11. Apparatus of claim 10, further comprising structure supporting an auger in an interior passage of the tube adjacent to the discharge opening, and wherein the door is supported by a hinge mounted in connection with the structure.

12. Apparatus of claim 10, comprising a biasing element yieldably biasing the door toward the closed position.

13. Apparatus of claim 10, comprising a magnetic latch configured and operable for releasably holding the door in the closed position.

14. Apparatus of claim 10, wherein the door has a concavity which faces an interior passage of the tube when the door is in the closed position, and which spaces a substantial portion of the door above a stream of grain discharged from the opening when the door is supported in the open position by the lowermost portion of the door.

15. Apparatus of claim 14, wherein the door has a C-shaped profile when viewed from a side direction, which positions the center of gravity of the door outwardly of the opening when the door is in the open position.

16. Apparatus of claim 14, wherein the door has an L-shaped profile when viewed from a side direction, which positions the center of gravity of the door outwardly of the opening when the door is in the open position.

17. Dribble control apparatus for a grain unloading conveyer for a combine harvester, comprising:

a dribble control door connected to an upper portion of a tube of the conveyor for pivotal movement between a closed position covering at least a lower portion of a discharge opening of the tube for preventing dribbling of grain from the opening, and an open position wherein the door will be supported by a lower portion thereof on a stream of grain discharged from the opening, the tube having middle peripheral portions bounding opposite sides of the opening, respectively, having shapes which bulge outwardly in a direction of grain discharge from the opening, and wherein the door has an angular shaped middle portion which at least generally conforms to the shapes of the middle peripheral portions so as to be located in abutting relation thereto when the door is in the closed position, and so as to be located at least substantially above a stream of grain supporting the door in the open position, wherein the lower portion includes a lowermost sidewardly extending lip configured for holding the door in the open position on a stream of grain discharged from the discharge opening, mostly away from the stream of grain, while directing at least an outermost portion of the stream downwardly, wherein the lip comprises a generally flat surface positioned and oriented to abut a lower peripheral portion of the tube when the door is in the closed position, and configured to ride on a stream of grain discharged from the opening for holding the door in the open position, wherein the flat surface is straight, so as to impart a flat shape on an outermost periphery of a stream of grain discharged from the discharge opening.

* * * * *